Patented Jan. 10, 1950

2,493,843

UNITED STATES PATENT OFFICE 2,493,843

PLASTICIZING ELASTOMERS

John Richard Vincent, Newport, Del., assignor to E. I. du Pont de Nemours & Company, Wilmington, Del., a corporation of Delaware No Drawing. Application October 5, 1946, Serial No. 701,395

9 Claims. (Cl. 260—32.6)

This invention relates to the plasticizing of elastomers, and more particularly to an improved process for increasing the plasticity of elastomers by intimately incorporating therein an anilide of a beta-keto acid.

It is well known that, in the working of natural rubber and synthetic rubbers, the material in the unvulcanized state is generally tough and hard and requires considerable working or chemical treatment to make it sufficiently plastic for proper processing. Usually, chemical plasticizers are incorporated in such elastomers in the unvulcanized state to give them improved working properties. These plasticizers are usually sulfur compounds or sulfur-containing materials such as mercaptans, thioacids, thiurams, etc. These sulfur-containing plasticizers, when incorporated in the elastomers, offer certain disadvantages in the subsequent use of the elastomers, particularly with regard to the tarnishing of metals such as silver, etc., and, in some cases, there are indications which lead to the belief that certain of these plasticizers contribute to the instability of the polymers themselves.

It is an object of the present invention to provide an improved process for plasticizing elastomers by intimately incorporating therein non-sulfur containing plasticizing agents. It is a further object of the invention to provide an improved process for plasticizing elastomers by intimately incorporating therein anilides of beta-keto acids such as acetoacetanilide and simple derivatives thereof.

I have found that elastomers which are polymers of 1,3-diene compounds or copolymers thereof with mono-olefinic compounds may be plasticized by intimately incorporating therein from 0.1% to 5.0%, based on the weight of the elastomer, of an anilide of a beta-keto acid. These plasticizing agents may be incorporated in the elastomer by working on the usual rubber mill or in an internal mixer at temperatures of from 30° to 160° C., or they may be added to the elastomer latex before coagulation. The anilides of the beta-keto acids are particularly suitable for plasticizing natural rubber and the rubber-like butadiene-styrene interpolymers, butadiene-acrylonitrile interpolymers, chloroprene (2-chloro-1,3-butadiene) polymers and chloroprene interpolymers which are illustrative of the type of elastomers referred to by Fisher as "elastoprenes" in his suggested nomenclature of rubber-like materials found in the Jr. of Ind. & Eng. Chem., vol. 31, No. 8 of August 19, 1939, pages 941–945. In general, the synthetic rubbers of the above mentioned classes contain at least 50% of the 1,3-butadiene compound.

The following examples are given to illustrate the invention. The parts used are by weight.

*Example 1*

Chloroprene was polymerized in an alkaline emulsion, using the following recipe:

| | Parts |
|---|---|
| Chloroprene | 100 |
| Sulfur | 0.7 |
| Nancy wood rosin | 4.0 |
| Stearic acid | 0.25 |
| Daxad-11 [1] | 0.75 |
| $K_2S_2O_8$ | 0.48 |
| NaOH | 0.9 |
| $H_2O$ | 155.6 |

[1] Daxad-11 is the sodium salt of the condensation product of naphthalene sulfonic acid and formaldehyde.

The sulfur, rosin and stearic acid were dissolved in the chloroprene, which was then emulsified in the water containing the other ingredients.

The polymerization was carried out at 40° C. with agitation and continued until the specific gravity of the polymer emulsion reached a value of 1.068. The polymerization was then stabilized by the addition of varying amounts of the plasticizers listed in the following table, which, when added to the polymerization mass, stop the polymerization, and, after acidifying to litmus with a 10% solution of acetic acid, was coagulated with brine. The plasticity and recovery numbers (Williams' Parallel Plate plastometer-high plasticity numbers mean low plasticity) of polymers stabilized with different materials is tabulated below.

| Plasticizer | Plasticity | Recovery |
|---|---|---|
| None | 242 | 157 |
| 1 part Acetoacetanilide | 131 | 129 |
| 2 parts Acetoacetanilide | 116 | 94 |
| 2 parts Tetraethyl thiuram disulfide | 154 | 58 |
| 2 parts Tetraethyl thiuram disulfide+2 parts Acetoacetanilide | Too soft to handle. | |

If the polymerization is carried out in the presence of acetoacetanilide, the rate is much lower but the resulting polymer is softer than a similar polymer made in the absence of acetoacetanilide.

The above experiments show that acetoacetanilide, incorporated into a polymer before coagulation, causes that polymer to have a higher plasticity and a lower recovery than a similar polymer obtained in the absence of acetoacetanilide.

Polymers obtained in the absence of acetoacetanilide can be plasticized by incorporating acetoacetanilide into the dry polymer, as illustrated in the following examples.

*Example 2*

Samples of the various elastomers identified in the following tables were milled, with and without 2% of acetoacetanilide, based on the weight of elastomer, as the plasticizer, on a 50° C. rubber mill. After 3 minutes, two plasticity pellets were cut from the sample and milling continued for 2 minutes longer. Then two more pellets were cut, etc., for the various periods of milling indicated in the tables. (Each value is the average of two determinations.) The various elastomers employed in these tests are products of commerce which may be particularly characterized as follows:

GR-M—A sulfur modified chloroprene polymer.
GR-M-10—A sulfur modified chloroprene polymer containing an anti-oxidant.
GR-S—An interpolymer containing approximately 75% 1,3-butadiene and 25% styrene.
Hycar OR-15—An interpolymer containing approximately 65% of 1,3 butadiene and 35% acrylonitrile.
Hycar OR-25—An interpolymer containing approximately 75% of 1,3-butadiene and 25% acrylonitrile.

| Milling Time | GR-M Plasticizer | | | | GR-M-10 Plasticizer | | | |
|---|---|---|---|---|---|---|---|---|
| | None | | 2% | | None | | 2% | |
| | Plast. | Recov. | Plast. | Recov. | Plast. | Recov. | Plast. | Recov. |
| 3 min | 85 | 0 | 60 | 0 | 94 | 2 | 72 | 0 |
| 5 min | 78 | 0 | 56 | 0 | 82 | 0 | 64 | 0 |
| 10 min | 69 | 0 | 54 | 0 | 66 | 0 | 62 | 0 |
| 15 min | 64 | 1 | 50 | 0 | 64 | 0 | 57 | 0 |

| Milling Time | GR-S Plasticizer | | | | Hycar OR-15 Plasticizer | | | |
|---|---|---|---|---|---|---|---|---|
| | None | | 2% | | None | | 2% | |
| | Plast. | Recov. | Plast. | Recov. | Plast. | Recov. | Plast. | Recov. |
| 2 min | 160 | 205 | 150 | 110 | 190 | 125 | 189 | 136 |
| 5 min | 142 | 143 | 145 | 180 | 195 | 165 | 195 | 130 |
| 10 min | 143 | 131 | 133 | 134 | 192 | 128 | 170 | 125 |
| 15 min | 138 | 107 | 127 | 102 | 195 | 115 | 165 | 130 |

| Milling Time | P-840 [1] Plasticizer | | | | Mercaptan Modified Chloroprene Polymer [2] Plasticizer | | | |
|---|---|---|---|---|---|---|---|---|
| | None | | 2% | | None | | 2% | |
| | Plast. | Recov. | Plast. | Recov. | Plast. | Recov. | Plast. | Recov. |
| 3 min | 112 | 18 | 93 | 2 | 116 | 10 | 111 | 10 |
| 5 min | 102 | 4 | 90 | 1 | 104 | 4 | 101 | 3 |
| 10 min | 90 | 0 | 76 | 0 | 92 | 2 | 87 | 0 |
| 15 min | 86 | 0 | 68 | 0 | 86 | 0 | 80 | 0 |

[1] A polymer made as described in Example 1 except that the sulfur was replaced with 0.25 part of iodoform.
[2] The mercaptan modified chloroprene polymer was produced by the process more particulary described in Example 1, with the following changes: The sulfur was replaced with 0.35 part of lorol mercaptan. Only 0.16 part of $K_2S_2O_8$ was used. Resin 731 was employed in place of Nancy wood rosin. 0.0008 part of sodium anthraquinone beta-sulfonate was added and the polymerization was stopped at approximately 73% yield by the addition of 0.02 part of phenothiazine.

*Example 3*

Certain of the runs of Example 2 were repeated on a 121° C. mill, with the following results:

| Milling Time | Rubber Plasticizer | | | | Hycar OR-25 Plasticizer | | | |
|---|---|---|---|---|---|---|---|---|
| | None | | 2% | | None | | 2% | |
| | Plast. | Recov. | Plast. | Recov. | Plast. | Recov. | Plast. | Recov. |
| 2 min | 182 | 56 | 161 | 46 | 204 | 155 | 210 | 141 |
| 5 min | 143 | 38 | 130 | 9 | 194 | 158 | 194 | 153 |
| 15 min | 104 | 2 | 91 | 1 | 204 | 168 | 175 | 122 |

| Milling Time | Hycar OR-15 Plasticizer | | | |
|---|---|---|---|---|
| | None | | 2% | |
| | Plast. | Recov. | Plast. | Recov. |
| 2 min | 242 | 150 | 192 | 146 |
| 5 min | 222 | 132 | 178 | 138 |

These experiments show that acetoacetanilide is a plasticizer at temperatures as low as 50° C. and as high as 121° C. The mixing may be carried out in an internal mixer in place of a mill, as illustrated in Example 4.

*Example 4*

Using a laboratory W. & P. mixer heated with steam under a pressure of 23 p. s. i., 50 g. of an unmodified chloroprene polymer (see Example 5) was worked, with and without the presence of 1.0 g. of acetoacetanilide, for 10 minutes. After this treatment, the two samples were examined on a rubber mill. The sample worked in the presence of the acetoacetanilide had better milling characteristics than the sample worked in its absence.

Example 5

Acetoacetanilide will increase the plasticity of a very tough variety of neoprene (made as in Example 1, omitting the sulfur and stabilizing with 0.25 part of NaHSO₃, 0.5 part of tetraethyl thiuram disulfide and 0.5 part of monobenzyl ether of hydroquinone). This polymer (500 gr.) was milled on a 12 inch, 121° C. mill for 4.5 minutes at 0.03 inch gauge, then for 1.0 minute at 0.02 inch gauge and then for 4.5 minutes at 0.015 inch gauge. The mill was cooled to 50° C. and the sample was milled for 5 minutes. The plasticity of the sample, without a plasticizer, was 348.

The procedure was repeated, using 500 g. of the polymer and 10 g. of acetoacetanilide. The plasticity of this sample was 264.

Example 6

Other anilides of acetoacetic acid also are plasticizers, as shown in the following table, where each compound was tested at 2% based on the amount of the same polymer used in Example 5. These tests were made by milling the elastomer for 10 minutes on a 125° C. rubber mill.

| Compound Added | Plasticity | Recovery |
| --- | --- | --- |
| None | 345 | 175 |
| Acetoacet-o-toluide | 280 | 140 |
| Acetoacet-m-cyanoanilide | 260 | 142 |
| Acetoacet-p-chloro-o-phenetidide | 268 | 137 |
| Acetoacet-p-chloro-o-anisidide | 250 | 135 |

It is very unusual to find materials which peptize an unmodified chloroprene polymer, as it has been generally recognized that such polymers are impossible or, at best, very difficult to soften.

The anilides of the beta-keto acids, which may be employed in place of those specifically designated above, are those having the formula:

R—CO—CH₂—CO—NHR' wherein R stands for phenyl and naphthyl radicals and alkyl radicals of from 1 to 6 carbon atoms, and R' stands for phenyl and naphthyl radicals. As further illustrative of the type of anilides of beta-keto acids, mention may be made of:

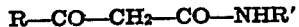
Propioacetanilide

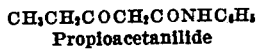
Isobutyoacet-alpha-naphthanilide

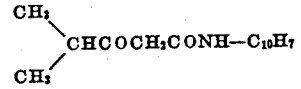
Phenylacetoacetanilide

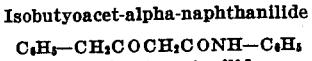
Benzoylacetanilide

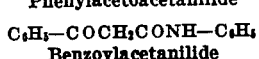
Beta-naphthoyl acetanilide

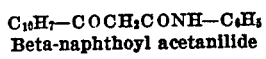
Hexahydrobenzoyl acetanilide

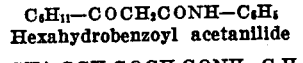
Tert-hexoyl acetanilide

This invention provides a means of increasing the plasticity and processability of elastomers with agents containing no sulfur, thus eliminating any instability that might be caused by sulfur compounds. It makes possible the use of some polymers in contact with metals, such as silver, without tarnishing the metal, as would occur if a sulfur-bearing material were present.

I claim:

1. The process of increasing the plasticity of an elastoprene of the class consisting of natural rubber and the polymers of 1,3-butadiene and of 2-chloro-1,3-butadiene which contain at least 50% of the 1,3-butadiene compound, which comprises intimately incorporating in such material in the unvulcanized form from 0.1% to 5.0% of an anilide of a beta-keto acid of the formula R—CO—CH₂—CO—NHR', wherein R stands for a radical of the group consisting of phenyl and naphthyl radicals and alkyl radicals of from 1 to 6 carbon atoms, and R' stands for a radical of the group consisting of phenyl and naphthyl radicals.

2. The process of increasing the plasticity of an elastoprene of the class consisting of natural rubber and the polymers of 1,3-butadiene and of 2-chloro-1,3-butadiene which contain at least 50% of the 1,3-butadiene compound, which comprises intimately incorporating in such material in the unvulcanized form from 0.1% to 5.0% of acetoacetanilide.

3. The process of increasing the plasticity of rubber which comprises intimately incorporating therein from 0.1% to 5.0% of acetoacetanilide.

4. The process of increasing the plasticity of a chloroprene polymer which comprises intimately incorporating therein from 0.1% to 5.0% of acetoacetanilide.

5. An elastoprene of the class consisting of natural rubber and the polymers of 1,3-butadiene and of 2-chloro-1,3-butadiene which contain at least 50% of the 1,3-butadiene compound containing from 0.1% to 5.0% of an anilide of a beta-keto acid of the formula R—CO—CH₂—CO—NHR', wherein R stands for a radical of the group consisting of phenyl and naphthyl radicals and alkyl radicals of from 1 to 6 carbon atoms, and R' stands for a radical of the group consisting of phenyl and naphthyl radicals.

6. An elastoprene of the class consisting of natural rubber and the polymers of 1,3-butadiene and of 2-chloro-1,3-butadiene which contain at least 50% of the 1,3-butadiene compound containing from 0.1% to 5.0% of acetoacetanilide.

7. An unvulcanized elastoprene of the class consisting of natural rubber and the polymers of 1,3-butadiene and of 2-chloro-1,3-butadiene which contain at least 50% of the 1,3-butadiene compound of improved plasticity containing from 0.1% to 5.0% of an anilide of a beta-keto acid of the formula R—CO—CH₂—CO—NHR', wherein R stands for a radical of the group consisting of phenyl and naphthyl radicals and alkyl radicals of from 1 to 6 carbon atoms, and R' stands for a radical of the group consisting of phenyl and naphthyl radicals.

8. An unvulcanized chloroprene polymer of improved plasticity containing from 0.1% to 5.0% of an anilide of a beta-keto acid of the formula R—CO—CH₂—CO—NHR', wherein R stands for a radical of the group consisting of phenyl and naphthyl radicals and alkyl radicals of from 1 to 6 carbon atoms, and R' stands for a radical of the group consisting of phenyl and naphthyl radicals.

9. An unvulcanized chloroprene polymer of improved plasticity containing from 0.1% to 5.0% of acetoacetanilide.

JOHN RICHARD VINCENT.

REFERENCES CITED

The following references are of record in the file of this patent:

UNITED STATES PATENTS

| Number | Name | Date |
|---|---|---|
| 2,381,526 | Throdahl | Aug. 7, 1945 |
| 2,415,356 | Kellog | Feb. 4, 1947 |

OTHER REFERENCES

Ind. and Eng. Chemistry, article by Fisher, pages 941–945, vol. 31, No. 8, August 1939.